(12) United States Patent
Niewiadomski et al.

(10) Patent No.: US 11,180,148 B2
(45) Date of Patent: Nov. 23, 2021

(54) DETECTION AND RESPONSE TO CONFINED TRAILER IN SYSTEM-ASSISTED HITCH OPERATION

(71) Applicant: Ford Global Technologies, LLC, Dearborn, MI (US)

(72) Inventors: Luke Niewiadomski, Dearborn, MI (US); Robert Bell, New Hudson, MI (US); Roger Trombley, Ann Arbor, MI (US); Douglas Rogan, Mountain View, CA (US); Nikhil Nagraj Rao, Cupertino, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 16/558,426

(22) Filed: Sep. 3, 2019

(65) Prior Publication Data

US 2021/0061281 A1 Mar. 4, 2021

(51) Int. Cl.
*B60W 30/18* (2012.01)
*B62D 15/02* (2006.01)
(Continued)

(52) U.S. Cl.
CPC ......... *B60W 30/18036* (2013.01); *B60R 1/00* (2013.01); *B60W 10/18* (2013.01); *B60W 10/20* (2013.01); *B60W 50/14* (2013.01); *B62D 15/0265* (2013.01); *G06T 7/70* (2017.01); *B60D 1/36* (2013.01); *B60R 2300/808* (2013.01); *B60W 2050/146* (2013.01);
(Continued)

(58) Field of Classification Search
CPC ........... B60W 30/18036; B60W 10/18; B60W 10/20; B60W 50/14; B60W 2554/00; B60W 2050/146; B60W 2420/42; B60W 2420/52; B60R 1/00; B60R 2300/808; B62D 15/0265; B60D 1/36; G06T 2207/30252; G06T 7/70
See application file for complete search history.

(56) References Cited

U.S. PATENT DOCUMENTS 6,268,803 B1 * 7/2001 Gunderson ............. G01S 7/003
340/903
6,480,104 B1 11/2002 Wall et al.
(Continued)

FOREIGN PATENT DOCUMENTS

EP 2682329 A1 8/2014

*Primary Examiner* — Yazan A Soofi
*Assistant Examiner* — Naeem Taslim Alam
(74) *Attorney, Agent, or Firm* — Raymond Coppiellie; Price Heneveld LLP

(57) ABSTRACT

A system for assisting in aligning a vehicle for hitching with a trailer includes a vehicle steering system, a detection system outputting a signal including object position information of an area to a rear of the vehicle, and a controller. The controller receiving the object position data and identifying a targeted trailer and at least one additional object within the area to the rear of the vehicle and controlling the vehicle steering system to maneuver the vehicle during reversing to align a hitch ball mounted on the vehicle to a coupler of the targeted trailer. Upon aligning the hitch ball with the coupler, the controller presents an indication, if it is determined that the at least one additional object is within a threshold distance of a side of the targeted trailer.

20 Claims, 12 Drawing Sheets

(51) Int. Cl.
  *B60W 10/20*  (2006.01)
  *B60W 10/18*  (2012.01)
  *B60W 50/14*  (2020.01)
  *G06T 7/70*  (2017.01)
  *B60D 1/36*  (2006.01)
  *B60R 1/00*  (2006.01)

(52) U.S. Cl.
  CPC ..... *B60W 2420/42* (2013.01); *B60W 2420/52* (2013.01); *B60W 2554/00* (2020.02); *G06T 2207/30252* (2013.01)

(56) References Cited

U.S. PATENT DOCUMENTS

| | | | |
|---|---|---|---|
| 6,970,184 | B2 | 11/2005 | Hirama et al. |
| 7,171,769 | B2 | 2/2007 | Schultz et al. |
| 9,108,598 | B2 | 8/2015 | Headley |
| 9,211,889 | B1 * | 12/2015 | Hoetzer ................ G01S 15/931 |
| 9,457,632 | B1 | 10/2016 | Windeler et al. |
| 9,499,018 | B2 | 11/2016 | Gehrke et al. |
| 9,506,774 | B2 * | 11/2016 | Shutko ................ B60W 30/06 |
| 10,035,457 | B2 | 7/2018 | Singh et al. |
| 2005/0246081 | A1 | 11/2005 | Bonnet et al. |
| 2007/0225872 | A1 * | 9/2007 | Luebke ................ G08G 1/017 701/1 |
| 2012/0283909 | A1 | 11/2012 | Dix |
| 2014/0012465 | A1 | 1/2014 | Shank et al. |
| 2015/0217765 | A1 * | 8/2015 | Tokoro ................ G01S 13/867 701/1 |
| 2015/0234044 | A1 * | 8/2015 | Ouchi ................ G08G 1/166 342/27 |
| 2016/0101730 | A1 * | 4/2016 | Shehan ................ G01S 13/931 340/431 |
| 2016/0167583 | A1 * | 6/2016 | Schrepfer ............ B60R 11/04 348/148 |
| 2016/0272024 | A1 | 9/2016 | Bochenek et al. |
| 2017/0139411 | A1 * | 5/2017 | Hartung ................ G05D 1/0077 |
| 2018/0121742 | A1 * | 5/2018 | Son ................ B62D 13/06 |
| 2018/0215382 | A1 * | 8/2018 | Gupta ................ G05D 1/0214 |
| 2018/0251153 | A1 * | 9/2018 | Li ................ B60D 1/62 |
| 2019/0256139 | A1 * | 8/2019 | Ebart ................ B60D 1/62 |
| 2019/0382031 | A1 * | 12/2019 | Hu ................ G05D 1/0077 |
| 2020/0062257 | A1 * | 2/2020 | Berkemeier ......... G05D 1/0088 |
| 2020/0077564 | A1 * | 3/2020 | Boydens ................ A01B 69/001 |
| 2020/0097021 | A1 * | 3/2020 | Carpenter ............ B60D 1/06 |
| 2020/0174112 | A1 * | 6/2020 | Xing ................ G01S 13/867 |

* cited by examiner

DETECTION AND RESPONSE TO CONFINED TRAILER IN SYSTEM-ASSISTED HITCH OPERATION

FIELD OF THE INVENTION

The present invention generally relates to a vehicle hitch assistance system. In particular, the system is configured to determine if a targeted trailer is confined by an adjacent object and to present a corresponding indication to a driver.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause the vehicle to come into contact with the trailer. Accordingly, further advancements may be desired.

SUMMARY OF THE INVENTION

According to one aspect of the present disclosure, a vehicle steering system, a detection system outputting a signal including object position information of an area to a rear of the vehicle, and a controller. The controller receiving the object position data and identifying a targeted trailer and at least one additional object within the area to the rear of the vehicle and controlling the vehicle steering system to maneuver the vehicle during reversing to align a hitch ball mounted on the vehicle to a coupler of the targeted trailer. Upon aligning the hitch ball with the coupler, the controller presents an indication, if it is determined that the at least one additional object is within a threshold distance of a side of the targeted trailer.

Embodiments of the first aspect of the invention can include any one or a combination of the following features:
the system further includes a vehicle brake system, and the controller further controls the vehicle brake system when maneuvering the vehicle during reversing to align the hitch ball with the coupler;
the detection system includes at least one camera mounted on the vehicle and outputting a video signal including image data of the area to the rear of the vehicle, and the controller identifies the targeted trailer in the image data and derives a path for maneuvering the vehicle during reversing to align the hitch ball with the coupler;
the detection system further includes at least one radar unit mounted on the vehicle and outputting a signal including point detection data of the area to the rear of the vehicle, and the controller identifies the targeted trailer and the at least one additional object in the point detection data in determining that the at least one additional object is within the threshold distance of the side of the targeted trailer;
the controller further identifies the at least one additional object in the image data in determining that the at least one additional object is within the threshold distance of the side of the targeted trailer;
the controller identifies the at least one additional object in the image data when the controller is unable to identify at least one of the targeted trailer and the at least one additional object in the point detection data;
the controller uses a neural network in identifying the at least one additional object in the image data;
it is determined that the at least one additional object is within a threshold distance of a side of the targeted trailer when the at least one additional object is at least partially laterally aligned with the targeted trailer;
the threshold distance is about 1 meter;
the indication relates to the at least one object restricting a lateral twist area of the targeted trailer; and
the system further includes a vehicle-human machine interface having a video screen and connected with the controller, and the warning is presented on the video screen.

According to another aspect of the present disclosure, a vehicle includes a steering system controlling the position of a pair of steered wheels of the vehicle, a hitch ball mounted on a rear of the vehicle, and a detection system outputting a signal including object position information of an area to the rear of the vehicle. The vehicle further includes a controller assisting in aligning a vehicle for hitching with a trailer by receiving the object position data and identifying a targeted trailer and at least one additional object within the area to the rear of the vehicle and controlling the vehicle steering system to maneuver the vehicle during reversing to align the hitch ball mounted with a coupler of the targeted trailer. Upon aligning the hitch ball with the coupler, the controller presents an indication, if it is determined that the at least one additional object is within a threshold distance of a side of the targeted trailer.

According to another aspect of the present disclosure, a method for aligning a vehicle for hitching with a trailer includes receiving object position data from a vehicle detection system outputting a signal including object position information of an area to a rear of the vehicle and identifying a targeted trailer and at least one additional object within the area to the rear of the vehicle using the object position data. The method further includes controlling the vehicle steering system to maneuver the vehicle during reversing to align a hitch ball mounted on the vehicle to a coupler of the targeted trailer. Upon aligning the hitch ball with the coupler, an indication is presented to a driver, if it is determined that the at least one additional object is within a threshold distance of a side of the targeted trailer.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
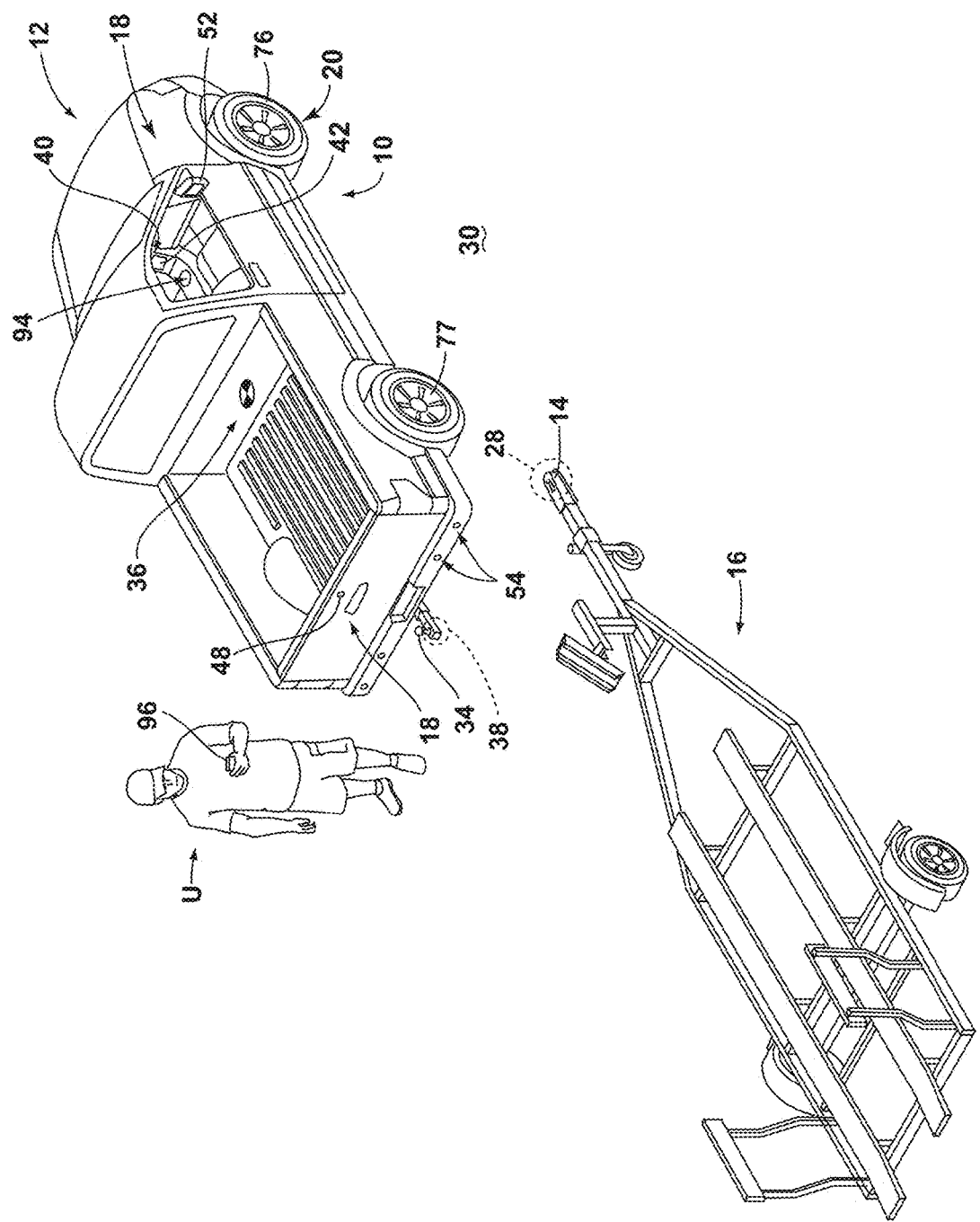
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system or a "hitching assistance" system) for a vehicle 12. In particular system 10 includes a vehicle steering system 20, a detection system (including in various combinations a radar system 90 and a camera system 18) outputting a signal including object position information (including at least one of object point data from the radar system 90 or image data 55 from the camera system 18) of an area to a rear of the vehicle 12, and a controller 26. The controller 26 receives the object position data and identifies a targeted trailer 16 and at least one additional object (which may be another trailer 116 or an additional object O) within the area to the rear of the vehicle 12 and controlling the vehicle steering system 20 to maneuver the vehicle 12 during reversing to align a hitch ball 34 mounted on the vehicle 12 to a coupler 14 of the targeted trailer 16. Upon aligning the hitch ball 34 with the coupler 14, the controller 26 presents an indication 98a,98b, if it is determined that the at least one additional object 116 or O is within a threshold distance D of a side of the targeted trailer 16.

Figure 2:
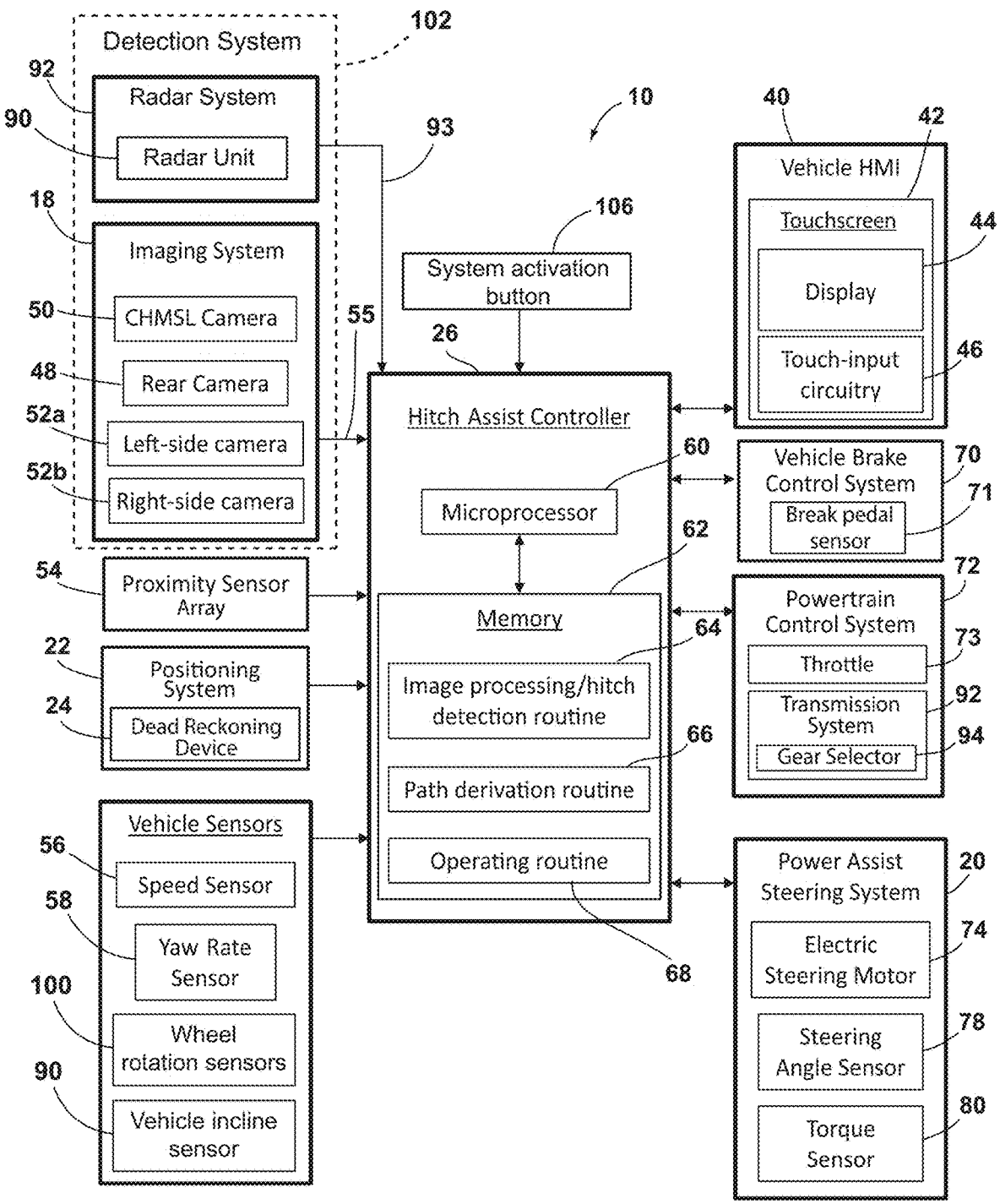
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle S. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
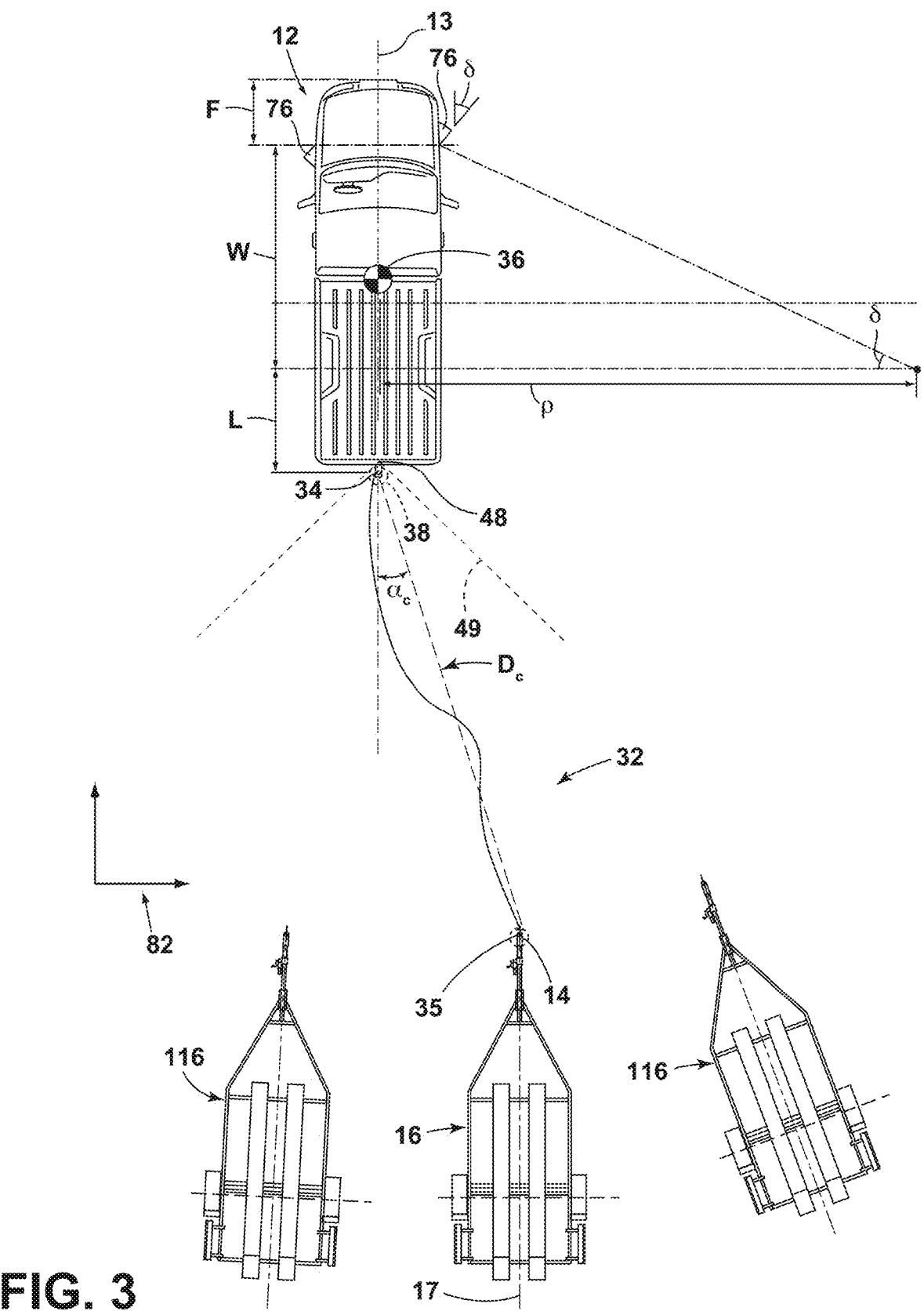
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate γ, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing routine 64 and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CHMSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CHMSL)

camera 50, and side-view cameras 52*a* and 52*b*, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53*a*, 53*b*, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52*a*, and 52*b* within imaging system 18. In either example, the image processing routine 64 can include information related to the positioning of any cameras 48, 50, 52*a*, and 52*b* present on vehicle 12 or utilized by system 10, including relative to the center 36 (FIG. 1) of vehicle 12, for example such that the positions of cameras 48, 50, 52*a*, and 52*b* relative to center 36 and/or to each other can be used for object positioning calculations and to result in object position data relative to the center 36 of vehicle 12, for example, or other features of vehicle 12, such as hitch ball 34 (FIG. 1), with known positions relative to center 36. In one aspect, the various systems and vehicle features discussed herein, including imaging system 18, positioning system 22, brake control system 70, powertrain control system 72, power assist steering system 20, proximity sensor array 54, positioning system 22, and the vehicle sensors discussed herein my generally used for purposes of vehicle control, such as under control of the user, including potentially with assistance of an onboard computer or other processor communicating with the systems and features. In this manner, the systems and features can be referred to collectively as a vehicle control system that may be utilized by controller 26 for the automatic vehicle control functionality discussed herein.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of an number of different types, sizes or configurations of trailers compatible with system 10, or trailers in general. Controller 26 can seek confirmation from the user that the identification of the trailer 16 is accurate and is the correct trailer for which to complete an assisted hitching operation, as described further below. After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the position 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ of offset between a line connecting hitch ball 34 and coupler 14 and the longitudinal axis 13 of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without collision between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle $\delta$ can be used to determine a corresponding turning radius p for vehicle 12 according to the equation:

$$\rho = \frac{W}{\tan \delta}, \quad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{W}{\tan \delta_{max}}. \quad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement $\Delta x$ of coupler 14 in a driving direction by determining the movement of coupler 14 in the vertical direction $\Delta y$ that will be needed to receive hitch ball 34 within coupler 14. Such functionality is discussed further in co-pending, commonly-assigned U.S. patent application Ser. Nos. 14/736,391 and 16/038,462, the entire disclosures of which are hereby incorporated by reference herein.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle $\delta$, as dictated by path 32, depending on the position of vehicle 12 therealong. It is additionally noted that in an embodiment, the path 32 may comprise a progression of steering angle $\delta$ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from a portable device 96, such a smartphone, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

Figure 4:
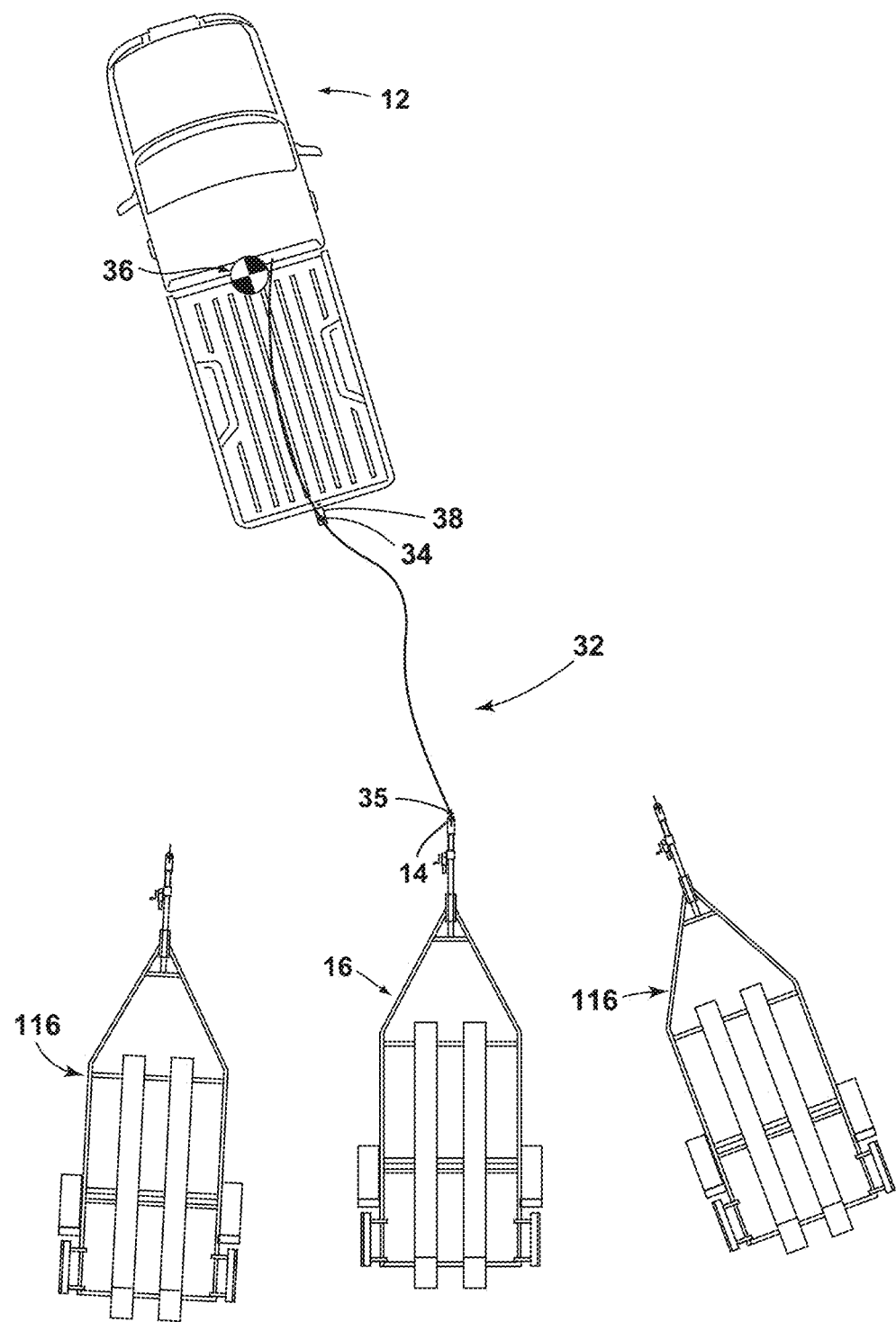
FIG. 4 is an overhead schematic view of the vehicle during a subsequent step of the alignment sequence with the trailer.
Figure 5:
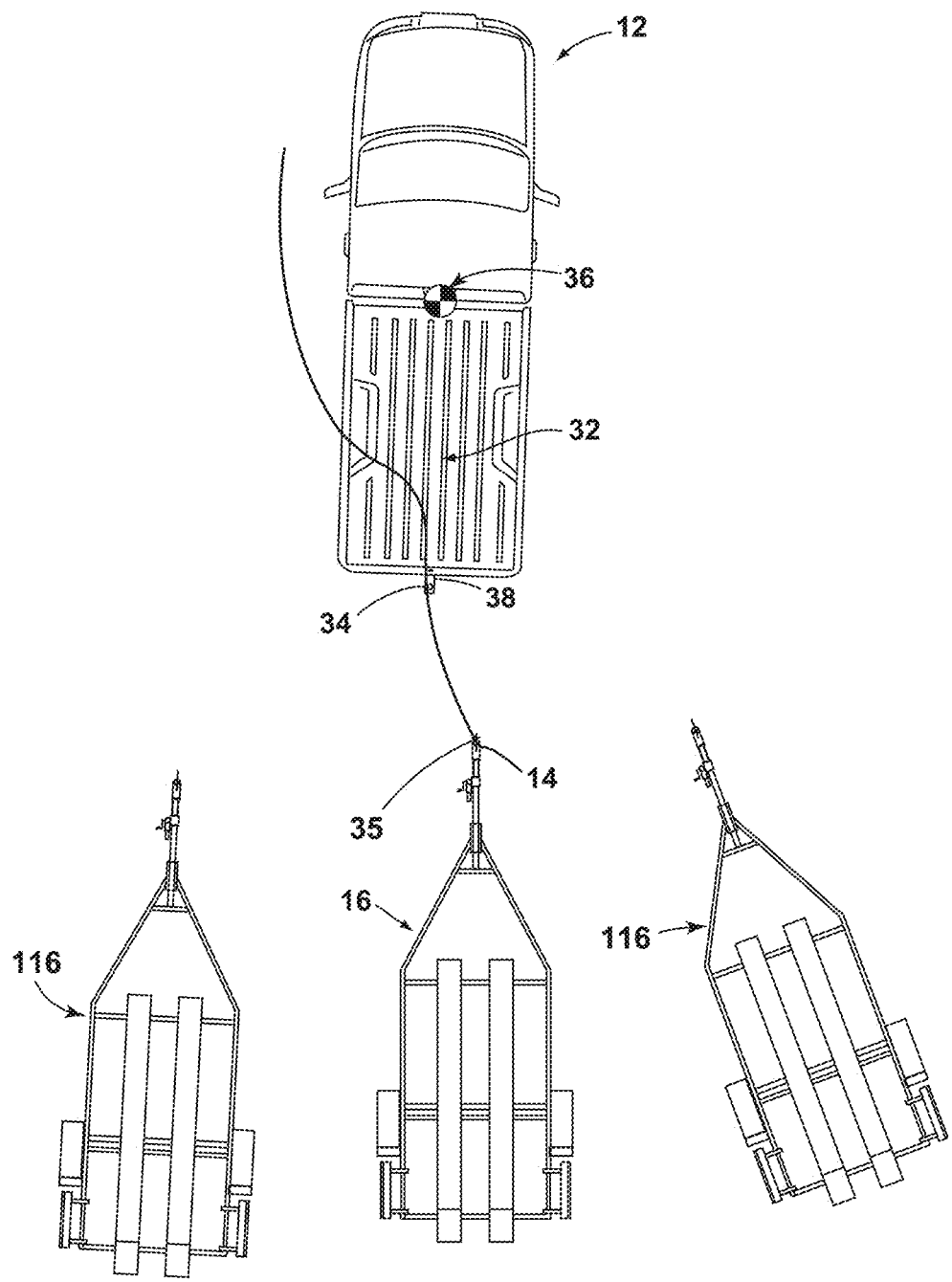
FIG. 5 is an overhead schematic view of the vehicle during a subsequent step of the alignment sequence with the trailer.
Figure 6:
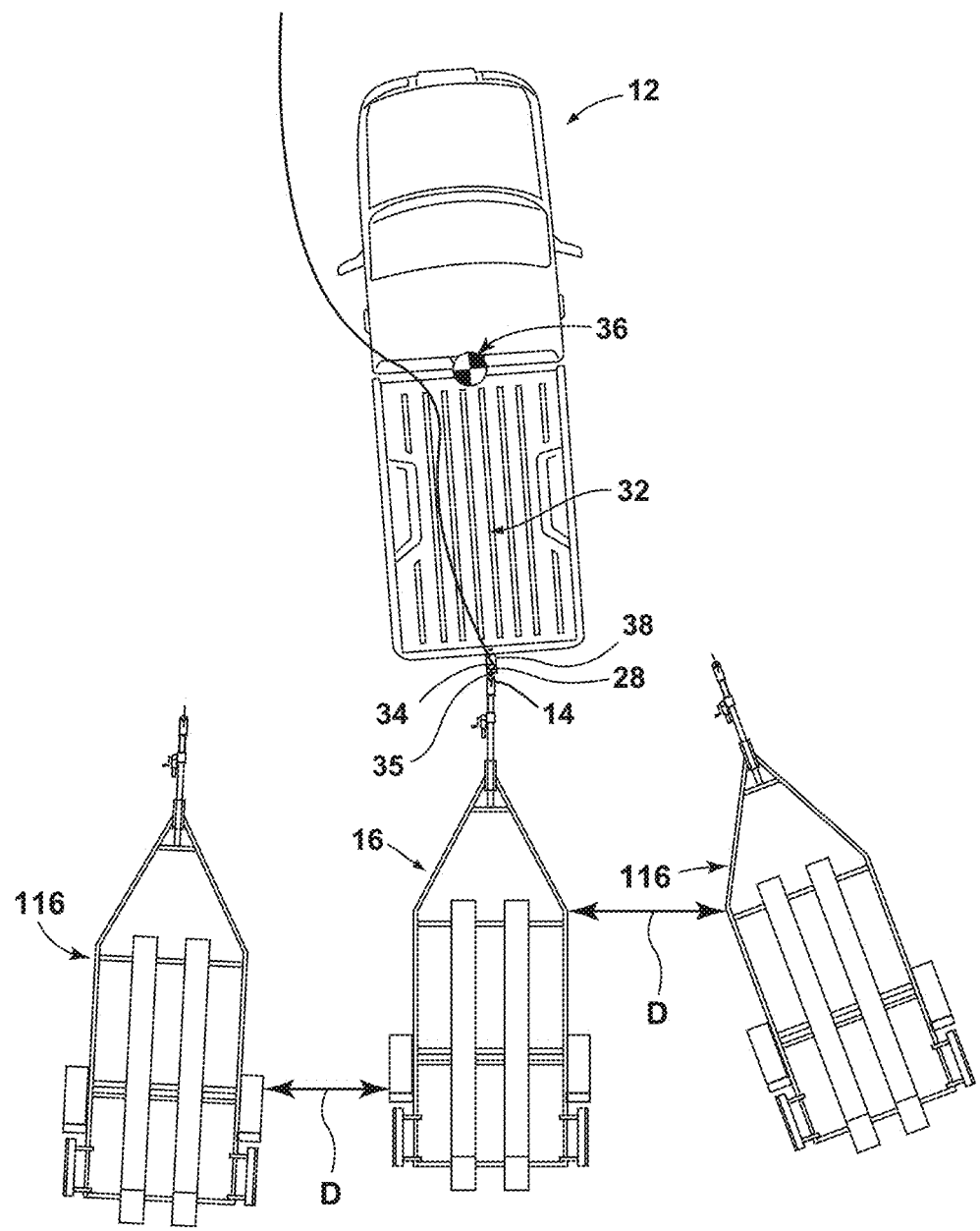
FIG. 6 is an overhead schematic view of the vehicle during a subsequent step of the alignment sequence with the trailer and showing the position of a hitch ball of the vehicle at an end of a derived alignment path.

As shown in FIGS. 4-6, once the trailer 16 and coupler 14 have been identified, and system 10 determines the path 32 to align hitch ball 34 with the coupler 14, the controller 26 executing operating routine 68 may continue to control vehicle 12 until hitch ball 34 is in the desired endpoint 35 relative to coupler 14 for coupler 14 to engage with hitch ball 34 when coupler 14 is lowered into horizontal alignment therewith. In the example discussed above, image processing routine 64 continuously monitors the positioning $D_c$, $\alpha_c$ of coupler 14, constantly or once available, during execution of operating routine 68, including as coupler 14 comes into clearer view of rear camera 48, with continued movement of vehicle 12 along path 32. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $\alpha_c$ information due to closer resolution or additional image data 55), including as vehicle moves closer to trailer 16, as shown in FIGS. 4 and 5. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position 38*d* thereof relative to the tracked position 28 of coupler 14, as discussed above and shown in FIG. 6.

During an assisted hitching operation, such as in the example described with respect to FIGS. 4-6, system 10 requires a minimum amount of longitudinal distance between the vehicle 12 and the trailer 16 to control movement of vehicle 12 with a level of precision desired to achieve the desired final position of hitch ball 34 with respect to coupler 14 (i.e., without overshooting the desired final location, such that hitch ball 34 moves past the coupler 14, or otherwise ending operating routine 68 with hitch ball 34 positioned relative to coupler 14 such that manual movement of trailer 16 is required). The required minimum distance can vary but is generally influenced by the requirements of image processing routine 64, as well as the requirements of speed sensor 56, the responsiveness of the throttle 73 and vehicle brake control system 70, as well as the general processing speed of controller 26 of other components of system 10. In one example, image processing routine 64 may require a minimum travel distance for calibration thereof, including to accurately identify coupler 14 and to assist in tracking of vehicle 12 movement. As discussed further below, the particular minimum distance can be estimated for a given implementation of system 10, based on known values or estimates for such factors. In general, because of the minimum travel distance requirement, if vehicle 12 is at a standstill with insufficient longitudinal distance remaining between hitch ball 34 and coupler 14, the system 10 is programmed to either not initiate operating routine 68 or, if already started, abort operating routine 68 to avoid the risk of overshooting the final target position such that hitch ball 34 moves past endpoint 35. In various examples, vehicle 12 may be brought to a standstill for reasons other than operating routine 68 causing the application of the vehicle brakes 70. In particular, vehicle 12 may come to a standstill before reaching the desired final target position due to uneven terrain acting on the vehicle wheels 76 or 77, or by the vehicle brakes 70 being manually applied by the driver. Because such events can cause a vehicle 12 standstill at any point along path 32, the present system 10 provides the ability to detect such a standstill event and to address it appropriately given the capabilities and requirements of system 10. In various examples, system 10 can address an early standstill by aborting, pausing, or automatically rectifying the standstill condition.

As mentioned above, the "longitudinal control" in an assisted hitching maneuver is the portion of vehicle 12 movement along path 32 controlled by the vehicle powertrain control system 72 and the vehicle brake system 70 with the "lateral control" being the portion controlled by the power assist steering system 20. It is to be understood that the lateral control requires movement of the vehicle such that the two control schemes operate together to move vehicle 12 along the path 32. In this respect, the longitudinal alignment of the path 32 with the coupler 14 is dictated by the longitudinal control (i.e., by the steering system 20) and the final stopping point of vehicle 12 along path 32 is dictated by the longitudinal control. In this respect, the final stopping point of the vehicle 12 along path 32 determines the alignment in the direction of travel between hitch ball 34 and coupler 14. In this manner, system 10 may be able to move vehicle 12 to the final target position in a precise manner, for example, such that trailer 16 does not have to be manually repositioned by the user, but can simply be lowered onto hitch ball 34. In one implementation of system 10, the accuracy in final longitudinal alignment of hitch ball 34 with coupler 14 can be to within 1 cm of a completely aligned position (center-to-center).

Figure 7:
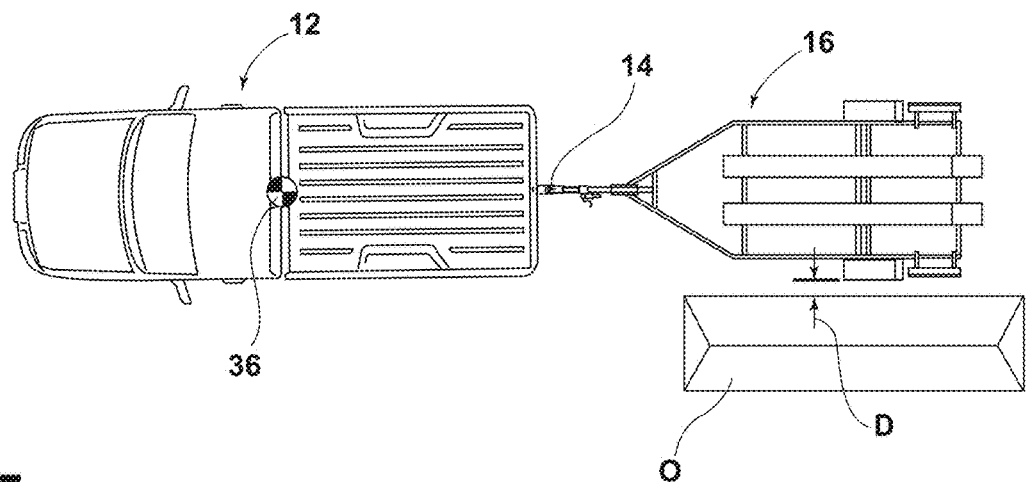
FIG. 7 is an overhead view of a vehicle hitched with a trailer that is in a confined position due to an adjacent object.
Figure 8:
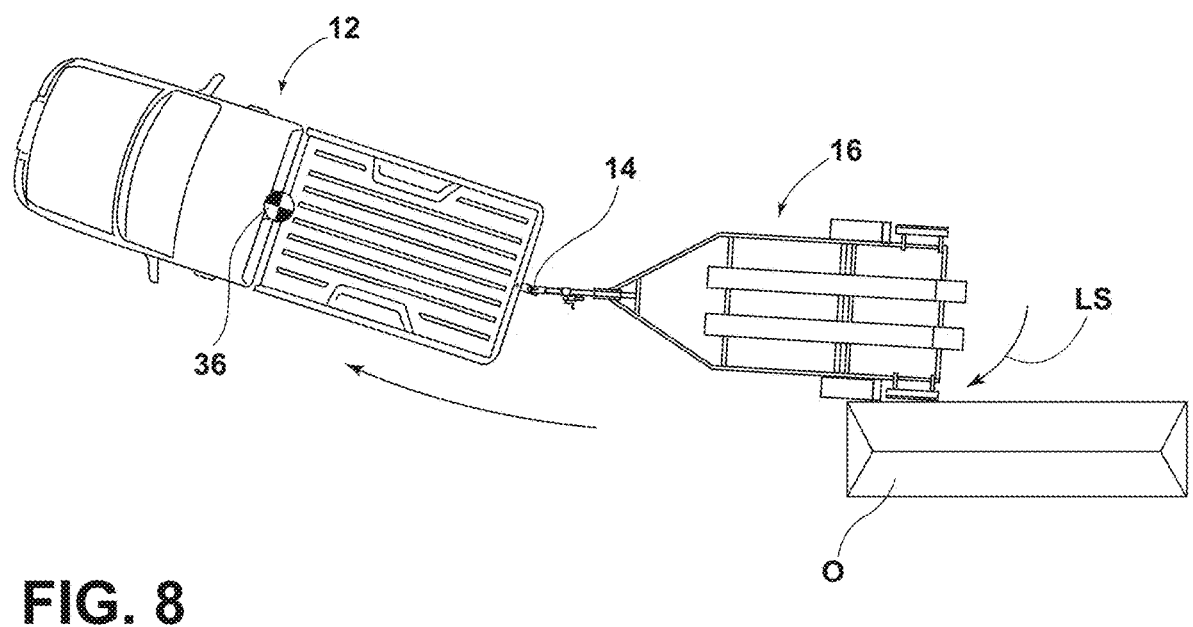
FIG. 8 is an overhead view of the vehicle hitched with the confined trailer of FIG. 7 shown in contact with the object after movement of the trailer by the vehicle.

As shown in FIGS. 4-6 a subject trailer 16 may be parked in a "confined" space, in particular by being positioned adjacent to other objects (i.e. other trailers 116—as depicted in FIGS. 4-6, buildings—as shown in FIGS. 7 and 8, etc.). System 10 may be configured to successfully distinguish the "targeted" trailer 16 from the additional object or objects adjacent to the targeted trailer 16, including when at least one of the additional objects is another trailer 116 (so long as the object is not obstructing possible paths 32 to align vehicle 12 with trailer 16). The presence of the additional object adjacent to trailer 16 may, however, create potential issues when, after completion of the hitching operation and engagement of the coupler 14 over hitch ball 34, the driver attempts to tow the trailer 16 out of the confined space. In this respect, due to the positioning of the trailer wheels 84 toward the middle (or just aft of the center of weight) of the trailer 16, some "lateral twist" (LT in FIG. 8, for example) of the trailer 16 may be observed when the initial launch position of the vehicle 12 is at an angle with respect to trailer 16. Such an arrangement can initially rotate trailer 16 (including while moving the trailer 16 longitudinally) with the back end 86 of the trailer moving laterally in a direction opposite the direction in which the coupler 14 is pulled (as shown in FIG. 8) by a lateral twist distance, which may exceed the distance D between the trailer 16 and an adjacent object O. Depending on the attention and experience of the driver, such lateral rotation can result in the back end 86 of trailer 16 contacting the adjacent object. A similar potential may also arise if the trailer is initially reversed in such a setting.

To potentially prevent such inadvertent contact of the back end 86 of trailer 16 with an adjacent object, system 10 can be further configured to detect objects O adjacent to the trailer 16 during the assisted hitching operation. When such an object O is detected, such as within a predetermined threshold distance D from trailer 16, system 10 can provide the driver with an instructional message, as discussed further below, to make the driver aware of the potential contact risks. Upon receiving the instructional message, the driver can decide if the contact risk is realistic based on their expected launch direction, and, if necessary, can correct the problem if needed before hitching the trailer, including by manually moving the trailer 16 or the adjacent object(s) O.

In general, the system 10 can be configured to monitor the area to the rear of vehicle 12, including the sides of trailer 16 and to detect objects O using the image processing routine 64 discussed above, as well as an additional object detection routine 88 the processes point detection data received from at least one radar unit 90 within a vehicle radar system 92. In this manner, system 10 can determine if a confined trailer 16 situation is present as an additional aspect of operating routine 68, path detection routine 66, or the like, based on a determination that one or more objects O is present on at least one side of the trailer 16, as shown in FIGS. 7 and 8. The determination can include the application of a threshold distance D between the detected object O and the corresponding side of the trailer 16. In one example, the threshold distance D can correspond with a maximum average anticipated lateral twist distance that can consider an anticipated range of sizes for trailer 16, as well as an anticipated range of launch angles that a driver may be likely to attempt (recognizing that a substantial segment of drivers are unlikely to attempt a very severe launch angle, due to an understanding of the lateral movement of the front portion of the trailer 16). In a particular example, the threshold distance may be on the order of about 1 m. Additionally, the system 10 may employ a confidence metric to the detection scheme, discussed further below, and require a minimum confidence level before determining a confined trailer 16 situation, such that user expectations are not diminished by a frequency of false instructions. As is understood, such confidence metrics consider the resolution of the data available and various other factors involved in the detection of the object. In one example system 10 can seek a confidence metric of at least 50% or at least 60% and in one implementation at least 75% before determine that the targeted trailer 16 is confined. If a confined trailer 16 is detected with the requisite confidence (if applicable) system 10 indicates the condition to the driver at the end of the assisted hitching operation (i.e. when the vehicle 12 reaches the end of the path 32 at which point the hitch ball 34 is aligned with the coupler 14). By waiting to indicate the condition to the driver, system 10 may avoid giving the driver the false impression that the confined trailer 16 condition may affect the ability to align the hitch ball 34 with the coupler 14.

Figure 9:
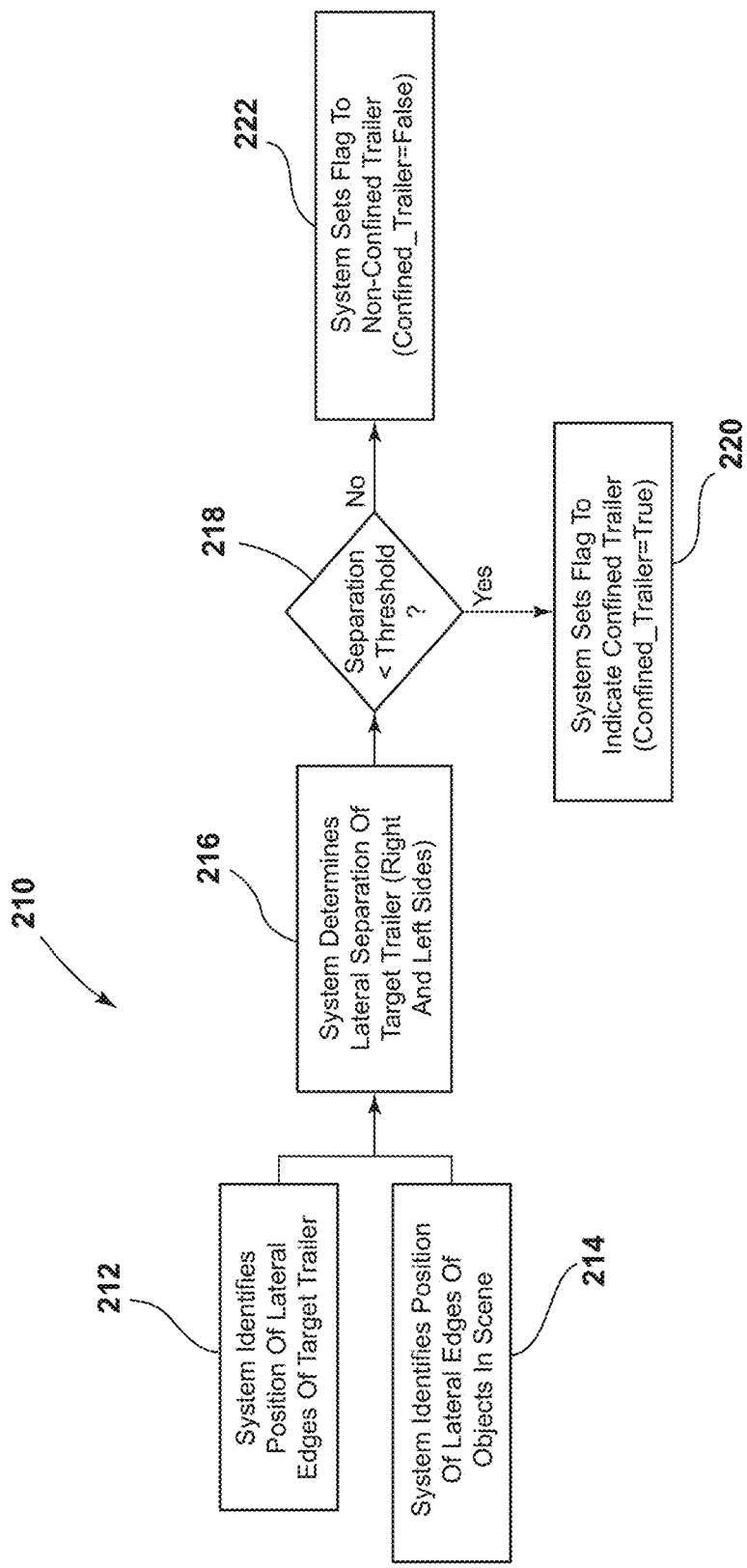
FIG. 9 is a flowchart depicting logic used by the system of FIG. 2 in determining the status of a targeted trailer as confined for use in a subsequent process step.

During the operation of system 10, as discussed above, once the system 10 is activated by way of the user indicating (such as through selection of a corresponding menu item or the like) that use of system 10 in executing an assisted hitching maneuver, as discussed above with respect to FIGS. 4-6. Once system 10 is, thereby, activated, system 10 uses the image processing algorithm 64 to attempt to identify a targeted trailer 16 within the image data 55 provided by and corresponding with the view of, for example, rear camera 48. Once the targeted trailer 16 is detected (which may include a particular positioning of vehicle 12 relative to trailer 16 and/or confirmation by the user, system 10, before, after, or during execution of path derivation routine 66, can run the object detection routine 88 using sensor data, such as object point location data 93 from radar system 92, to determine if the targeted trailer 16 is adjacent to objects O. In one respect the object detection routine 88 can include the identification of the targeted trailer 16 within the sensor data by identification of an object in a position that correlates with the location of the detected targeted trailer 16 in the image data (including by comparing data correlating the image data 55 and the sensor data with the localized coordinate system 82 of the area surrounding vehicle 12). The position of the targeted trailer 16 within the sensor data and as determined by the object detection routine 88 can be used to assess the relative distance D between any additional objects O detected by routine 88 and the sides of the targeted trailer 16 as an aspect of object detection routine 88. Once the targeted trailer 16 and any additional objects O are detected, the object detection routine 88 and the relative distances D assessed, the object and distance information, as well as confidence information in some implementations, are processed by system 10, such as by operating routine 68, to determine if the data indicates a confined trailer 16 according to the preset criteria. If no additional objects O within the predetermined threshold distance D of trailer 16 are detected, the system 10 proceeds through the assisted hitching maneuver and the end of system 10 operation, as discussed above. If one or more objects O is confidently identified within the predetermined distance of the targeted trailer 16, a flag is set in system 10 logic (i.e. in a data location later referenced by operating routine 68). An example of the logic 210 implemented in setting such a flag is shown in FIG. 9. In executing such logic, system 10 uses the object point location data 93 from radar system 92 to determine the lateral edges of the targeted trailer 16 (step 212) and their position relative to vehicle 12, as well as the lateral edges of any object O (including any additional trailers 116) within the area to the rear of vehicle 12 and the positions of any such edges relative to vehicle 12 (step 214). As discussed below, steps 212 and 214 can be carried out using radar system 92 alone or in connection with the image data 55 received from imaging system 18. The system 10 then determines the lateral separation of the target trailer 16 with respect to the detected edges thereof and any additional edges detected on the respective sides of the trailer 16 corresponding with the edges (step 216). In this respect, the lateral separation corresponds with the lateral distance D between the trailer 16 and such object(s) O,116. The lateral distances D are then compared against the threshold distance in step 218. If either lateral distance D is below the threshold, the system 10 then sets a corresponding flag in memory 62 to indicate that the trailer 16 may be confined (step 220). If all detected lateral distances D are above the threshold, no flag is set or a flag indicating that the trailer 16 is not detected as confined is set (step 222).

Figure 11:
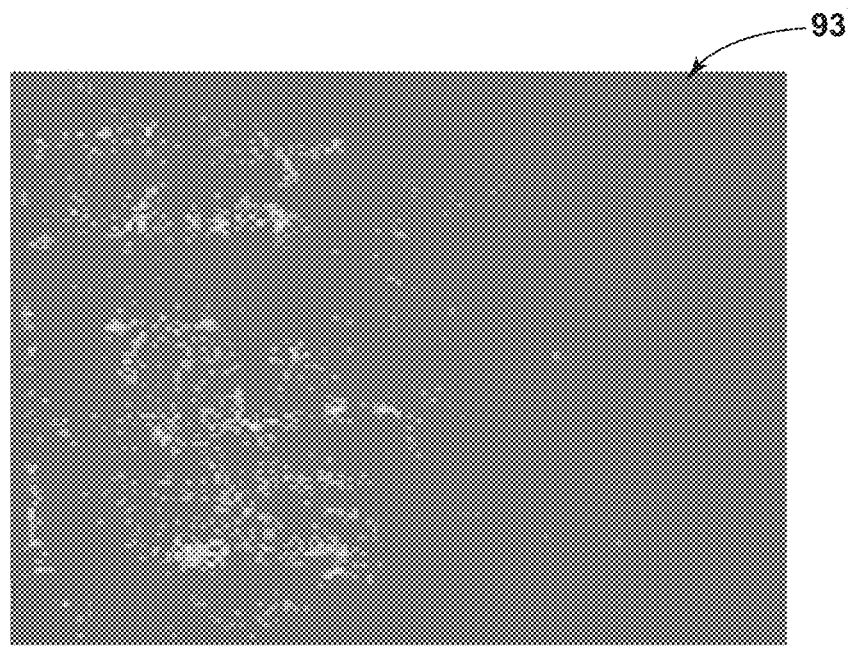
FIG. 11 is an example view depicting radar object point data of that may lack the detail to be used to determine a confined condition of a trailer.

In a further aspect of system 10 operation, the object detection routine 88 may seek to identify objects to the rear of vehicle 12, including the targeted trailer 16 and any adjacent additional objects O, by detecting and identifying the various positions of lateral edges of or otherwise indicating objects in the "scene" captured in the relevant data. In a particular implementation, system 10 can use data received from radar system 92 (including object point data received from radar unit 90, or multiple radar units), as well as the image data 55 from rear camera 48. The radar system 92 data and the image data 55 can be used independently, and in conjunction, to determine the presence and relative locations of objects O and targeted trailer 16. As shown in FIG. 11, system 10 may receive the object point location data 93 from radar system 90 in the form of a radar grid map 94 or may create the radar grid map using the available data from the radar system 92. This grid map 94 is correlated with the coordinate system 82 established with respect to vehicle 12 based on the location and calibration of radar unit 90, for example and is analyzed locate objects in the data and to determine the object corresponding with the targeted trailer 16, to classify any other objects O as other objects and to evaluate the position of such other objects O with respect to the targeted trailer 16. In one aspect, evaluating the position of the other detected objects O can include assessing whether any detected object is laterally aligned with the object O, which can be done using the radar data to determine the distances of the front (i.e. closest to vehicle 12) edges of the targeted trailer 16 and any detected objects O. If the detected front edge of any object O is, for example, within a predetermined range of the front edge of the targeted trailer 16, then the object O can be considered to be laterally adjacent trailer 16 such that the lateral distance between the object O and the trailer can be assessed to determine if the trailer 16 is confined. If the leading edge of any object O is sufficiently closer to or farther from vehicle 12 than the targeted trailer 16, then the object O can be considered not laterally aligned with trailer 16 such that trailer is not confined, regardless of the lateral distance between the object O and the trailer 16.

Figure 10:
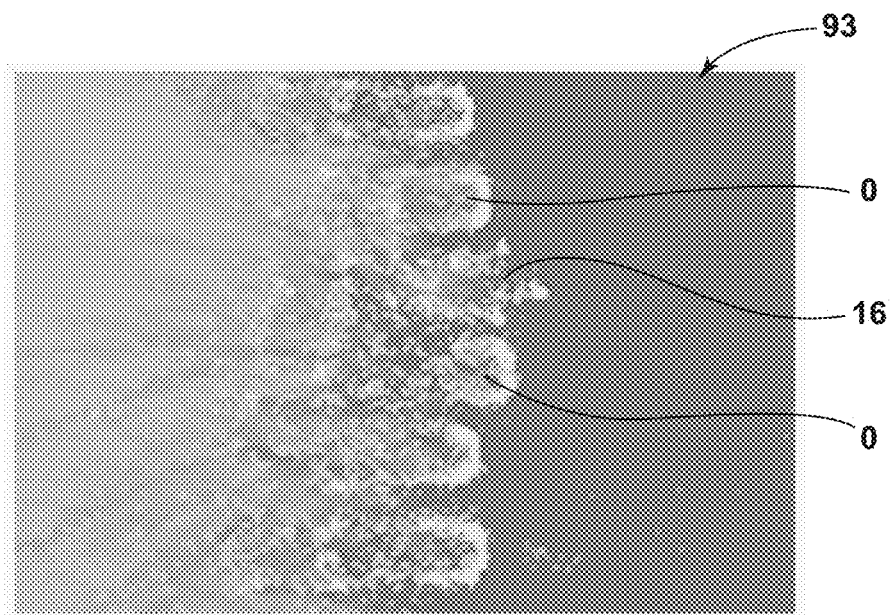
FIG. 10 is an example view depicting radar object point data of a targeted trailer and adjacent objects that can be used to determine a confined condition of the trailer.

As can be appreciated, the radar system 90 provides object point location data 93 over time, including through a number of successive scans of the relevant scene in which a sufficient number of positive detection points are collected. Further, movement of the vehicle to provide movement of the relevant scene can provide additional detection points and/or clarify the data by repeated positive detections in the same static locations during movement of vehicle 12. In this manner, if system 10 is activated upon vehicle 12 being started, little relevant data may exist at system 10 initiation. In one aspect, system 10 can be configured to continue to run object detection routine 88 during movement of vehicle 12 under control of system 10 in ruining operating routine 68, which may allow for the additional collection of data sufficient to confidently identify targeted trailer 16 and any additional objects within the radar system 92 data 93, as shown in FIG. 10. In some further cases, the path 32 traversed by vehicle 12 may be too short for such additional data to appreciably improve object detection from radar 92 system data, resulting in data 93 that is not clear enough for an accurate object detection, which is shown in an exemplary seen in FIG. 11. In such an instance or other similar situations, additional data may be needed for object detection routine 88.

Figure 12:
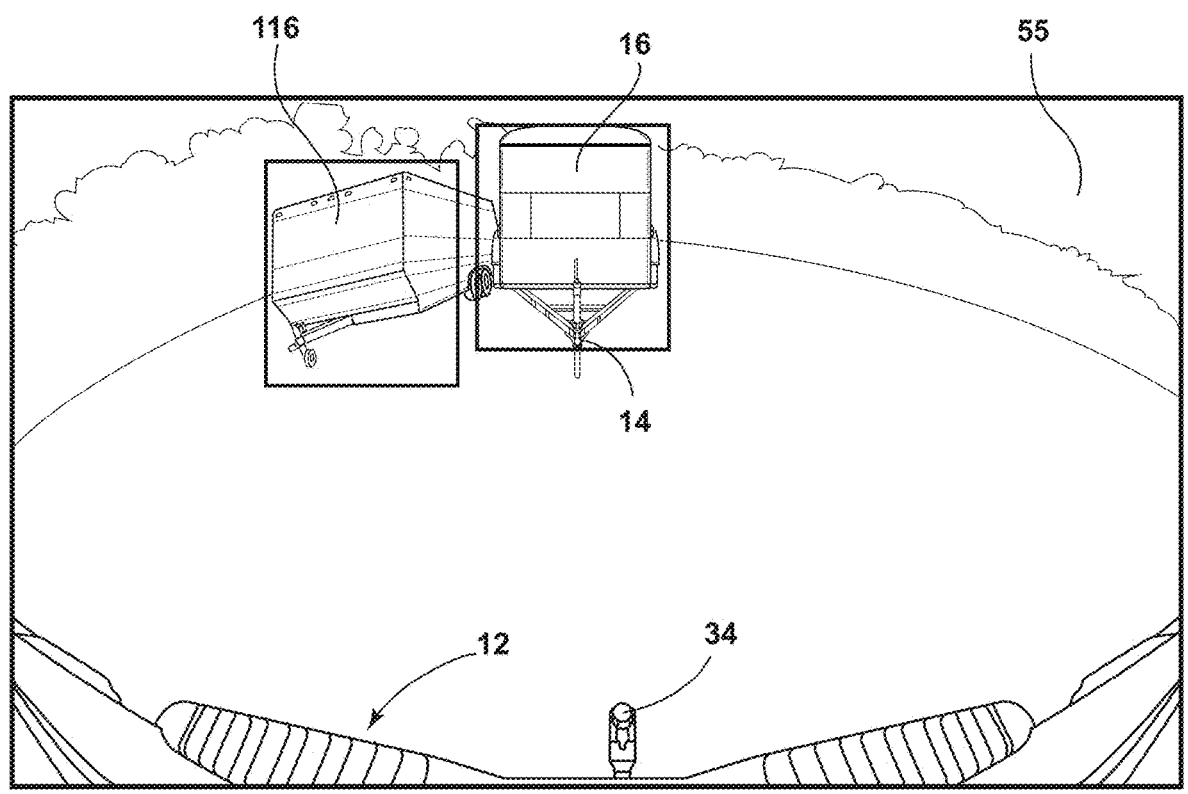
FIG. 12 is an example view depicting image data of a targeted trailer and an adjacent trailer that can be used to determine a confined condition of the trailer.

Accordingly, in a further aspect, object detection routine 88 can further use the image data 55 from rear camera 48, for example, including by the implementation of image processing and/or communication with image processing routine 64 with additional configuration thereof. As illustrated in FIG. 12, the image processing routine can also be configured to run the image data 55 through a neural network configured to identify objects within the image data, including by being trained on image data including various trailers and/or other objects (such as vehicles and the like) likely to be positioned adjacent a targeted trailer 16. Other machine learning applications similar to a neural network in function can be used in a similar manner. The object identification using image data 55 can be used to increase the confidence level attached to the overall detection scheme and based generally on the radar data. In such an example, the image data 55 can be used for object identification when the confidence level of the radar-based object detection is below a predetermined threshold (e.g., less than 75% or less than 60%). In other implementations, the image data 55 can be used for object detection in place of radar data when conditions known to lower the effectiveness of radar-based object detection are observed (including short travel distance, no vehicle movement before system 10 activation, or other conditions discussed above).

Figure 13:
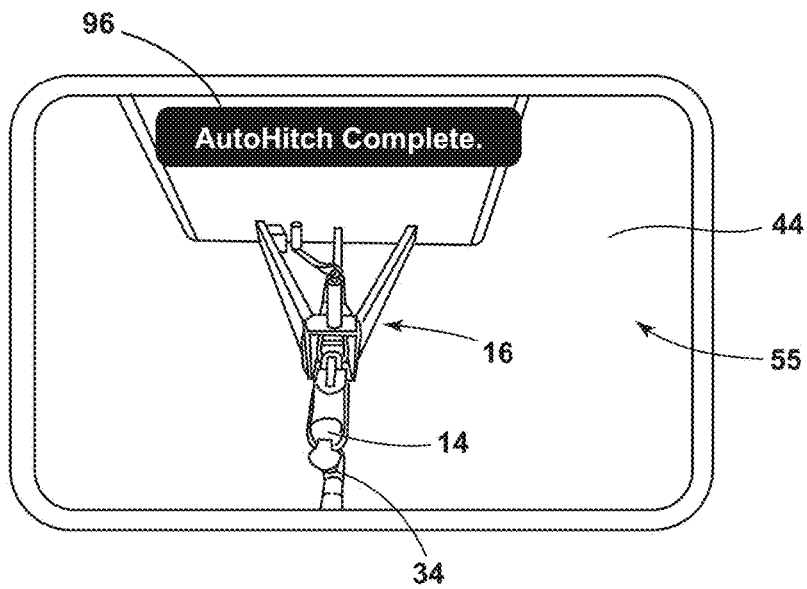
FIG. 13 is an example system message presented on a vehicle-human machine interface indicating completion of an automated hitching operation.
Figure 14A:
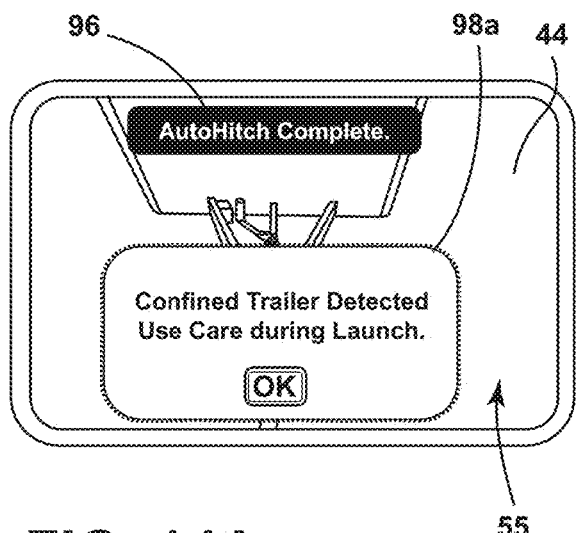
FIGS. 14A and 14B are examples of modified system message presented on vehicle-human machine interfaces indicating completion of an automated hitching operation when the targeted trailer is determined to be confined by an adjacent object.
Figure 14B:
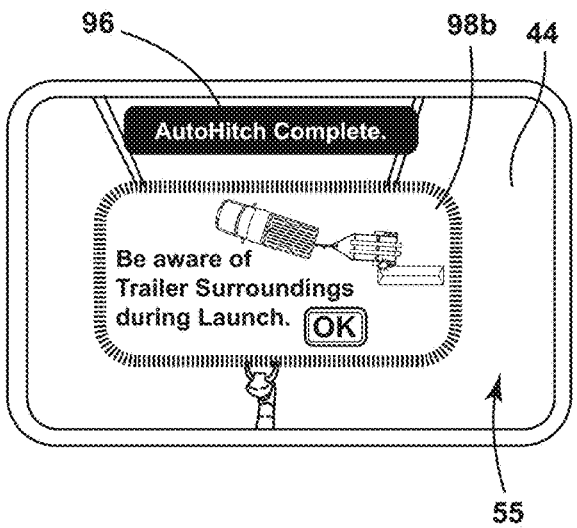

As discussed above, once the object detection routine 88 has been executed (or while the object detection routine continues to run), system 10 will use operating routine 68 to back the vehicle 12 toward the targeted trailer 16, whether or not a confined trailer 16 situation is identified, any such situation being flagged in operating routine 68 by communication with object detection routine 88. The operating routine 68 ends and the associated assisted hitching maneuver is considered complete when the hitch ball 34 is aligned underneath the trailer coupler 14. Once the system 10 completes the maneuver, an indication 96 of completion is portrayed to the driver on the screen 44 within the HMI 40, as shown in FIG. 13. If the targeted trailer 16 was determined to not be confined (i.e., when no flag associated with confined trailer 16 detection is present), no additional action is taken. However, if the flag associated with the targeted trailer 16 being confined is present, additional feedback or guidance can be provided to the driver. In this respect, the system 10 utilizes the HMI 50, including display screen 44 to indicate to the driver that the targeted trailer 16 is confined. In various respects, such an indication can be given using modified indications 98a or 98b, as illustrated in the examples of FIGS. 14A and 14B. In both examples, the indications 98a,98b are configured to communicate to the driver of the risk of contact with an adjacent object O or other trailer 116 and that care should be taken, including with respect to the initial driving direction of vehicle 12 once trailer 16 is connected therewith. Other implementations of the modified indications in the examples 98a,98b can be used, as would be understood.

Figure 15:
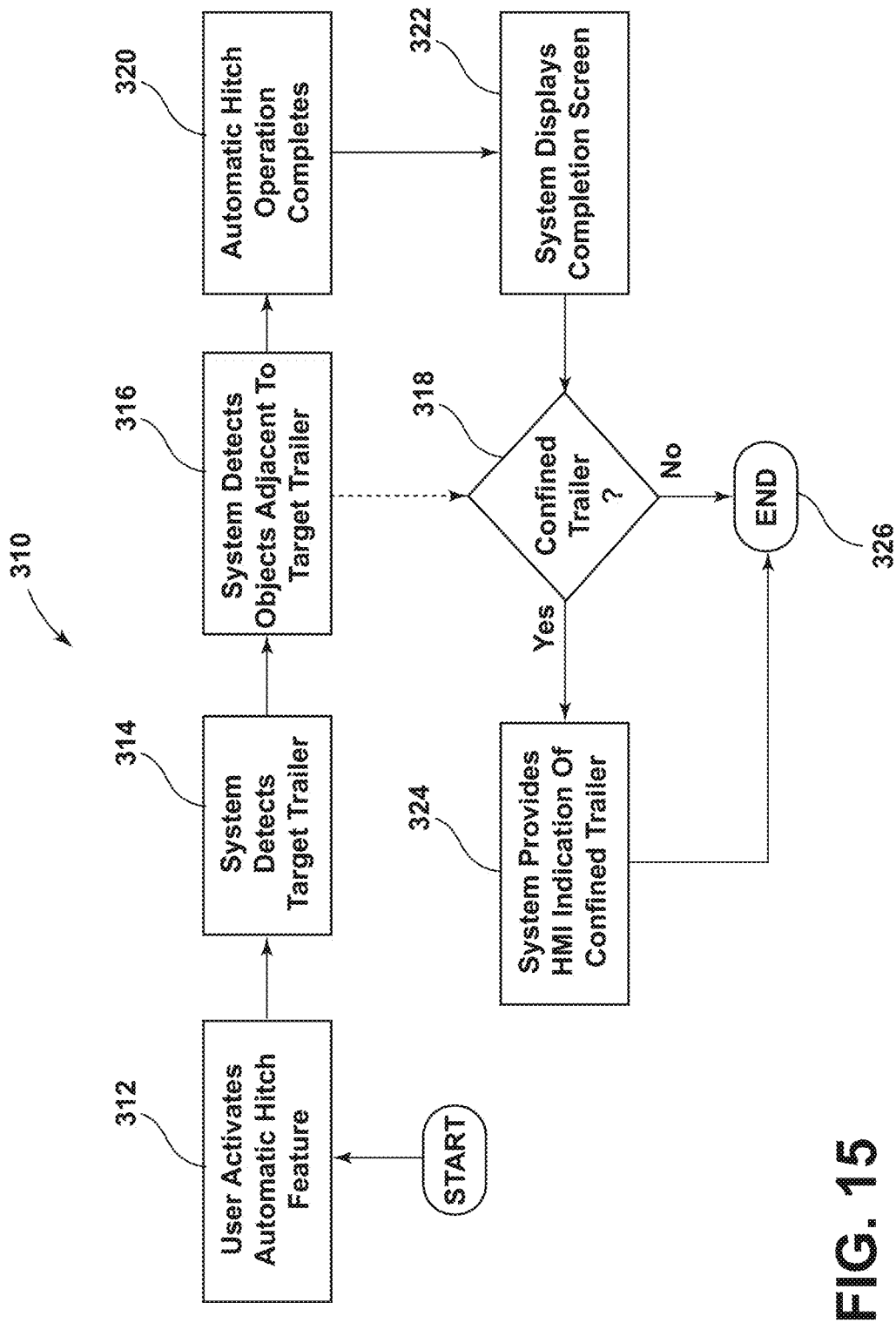
FIG. 15 is a flowchart depicting steps in a method for automatically aligning a vehicle for hitching with a trailer, including determining and indicating to a driver a confined trailer condition.

Turning to FIG. 15, in another aspect of the disclosure, a method 310 for aligning the above-described vehicle 12 for hitching with the targeted trailer 16 begins upon activation of the system 10 functionality described above in step 312. The system 10 then receives object position data 93 from a detection system 102 within or mounted to vehicle 12, the detection system 102 outputting a signal including object position information of an area to a rear of the vehicle 12. As discussed above, the position data can be in one or both of the point detection data 93 from radar system 90 and the image data 55 from rear camera 48. In this respect, the detection system 102 can be considered as including either the radar system 90, the camera system 18 or both, as applicable depending on the particular configuration of the associated system 10 and the particular use case thereof, as discussed above. Initially, system 10 uses the data to detect the targeted trailer 16 (step 314). Subsequently, system 10 also uses the data to determine if at least one additional object (including another trailer 116 or another object) is present within the area to the rear of the vehicle 12 using the object position data (step 316). Again, the utilized object position data can primarily be the object point data from the radar system 90 but can be supplementary by the image data 55. The method further includes controlling the vehicle steering system 20 to maneuver the vehicle 12 during reversing to align the hitch ball 34 mounted on the vehicle 12 to the coupler 14 of the targeted trailer 16 (step 320). Upon aligning the hitch ball 34 with the coupler 14, an indication 98a,98b (FIGS. 14A, 14B) is presented to a driver (step 324), if it is determined that the at least one additional object O (or trailer 116) is within a threshold distance D of a side of the targeted trailer 16 (step 318). If no confined trailer 16 situation is detected, system 10 displays a standard completion message 98 (FIG. 13). After display of such message, as determined, the system 10 operation is considered deplete and the routine 68 ends.

It is to be understood that variations and modifications can be made on the aforementioned system and related structures without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting in aligning a vehicle for hitching with a trailer, comprising:
    a vehicle steering system;
    a detection system outputting a signal including object position information of an area to a rear of the vehicle; and
    a controller:
        receiving the object position information and identifying a targeted trailer and at least one additional object within the area to the rear of the vehicle;
        controlling the vehicle steering system to maneuver the vehicle during reversing to align a hitch ball mounted on the vehicle to a coupler of the targeted trailer, while continuing to receive the object position information and determining a separation distance between the at least one additional object and an adjacent side of the trailer; and
        upon aligning the hitch ball with the coupler, presenting an indication if it is determined, during maneuvering of the vehicle during reversing, that the separation distance is less than a threshold distance.

2. The system of claim 1, further including a vehicle brake system, wherein:
    the controller further controls the vehicle brake system when maneuvering the vehicle during reversing to align the hitch ball with the coupler.

3. The system of claim 1, wherein:
    the detection system includes at least one camera mounted on the vehicle and outputting image data of the area to the rear of the vehicle; and
    the controller identifies the targeted trailer in the image data and derives a path for maneuvering the vehicle during reversing to align the hitch ball with the coupler.

4. The system of claim 3, wherein:
    the detection system further includes at least one radar unit mounted on the vehicle and outputting a signal including point detection data of the area to the rear of the vehicle; and
    the controller identifies the targeted trailer and the at least one additional object in the point detection data in determining that the at least one additional object is within the threshold distance of the side of the targeted trailer.

5. The system of claim 4, wherein the controller further identifies the at least one additional object in the image data in determining that the at least one additional object is within the threshold distance of the side of the targeted trailer.

6. The system of claim 5, wherein the controller identifies the at least one additional object in the image data when the controller is unable to identify at least one of the targeted trailer and the at least one additional object in the point detection data.

7. The system of claim 4, wherein the controller uses a neural network in identifying the at least one additional object in the image data.

8. The system of claim 1, wherein it is determined that the at least one additional object is within the threshold distance of a side of the targeted trailer when at least a portion of the at least one additional object is laterally aligned with at least a portion of the targeted trailer.

9. The system of claim 1, wherein the threshold distance is 1 meter.

10. The system of claim 1, wherein the indication relates to the at least one object restricting a lateral twist distance of the targeted trailer.

11. The system of claim 1, wherein:
    the system further includes a vehicle-human machine interface having a display screen and connected with the controller; and
    the indication is presented on the display screen in connection with an indication that the hitch ball is aligned with the coupler.

12. A vehicle, comprising:
    a steering system controlling the position of a pair of steered wheels of the vehicle;
    a hitch ball mounted on a rear of the vehicle;
    a detection system outputting a signal including object position information of an area to the rear of the vehicle; and
    a controller assisting in aligning the vehicle for hitching with a trailer by:
        receiving the object position information and identifying a targeted trailer and at least one additional object within the area to the rear of the vehicle;
        controlling the vehicle steering system to maneuver the vehicle during reversing to align the hitch ball mounted with a coupler of the targeted trailer, while continuing to receive the object position information and determining a separation distance between the at least one additional object and an adjacent side of the trailer; and
        upon aligning the hitch ball with the coupler, presenting a warning if it is determined, during maneuvering of the vehicle during reversing, that the separation distance is less than a threshold distance.

13. The vehicle of claim 12, wherein:
    the detection system includes at least one camera mounted on the vehicle and outputting a video signal including image data of the area to the rear of the vehicle; and
    the controller identifies the targeted trailer in the image data and derives a path for maneuvering the vehicle during reversing to align the hitch ball with the coupler.

14. The vehicle of claim 13, wherein:
    the detection system further includes at least one radar unit mounted on the vehicle and outputting point detection data of the area to the rear of the vehicle within the signal; and the controller identifies the targeted trailer and the at least one additional object in the point detection data in determining that the at least one additional object is within the threshold distance of the side of the targeted trailer.

15. The vehicle of claim 14, wherein the controller:

further identifies the at least one additional object in the image data in determining that the at least one additional object is within the threshold distance of the side of the targeted trailer; and identifies the at least one additional object in the image data when the controller is unable to identify at least one of the targeted trailer and the at least one additional object in the point detection data.

16. The vehicle of claim 12, wherein it is determined that the at least one additional object is within the threshold distance of a side of the targeted trailer when the at least one additional object is at least partially laterally aligned with the targeted trailer.

17. The vehicle of claim 12, wherein the threshold distance is about 1 meter.

18. The vehicle of claim 12, wherein the warning relates to the at least one object restricting a lateral twist area of the targeted trailer.

19. The vehicle of claim 12, further including a vehicle-human machine interface having a video screen and connected with the controller, wherein:

the controller presents the warning on the video screen in connection with an indication that the hitch ball is aligned with the coupler.

20. A method for aligning a vehicle for hitching with a trailer, comprising:

receiving object position data from a vehicle detection system outputting a signal including object position information of an area to a rear of the vehicle;

identifying a targeted trailer and at least one additional object within the area to the rear of the vehicle using the object position data;

using a controller within the vehicle to control a vehicle steering system to maneuver the vehicle during reversing to align a hitch ball mounted on the vehicle to a coupler of the targeted trailer, while using the object position information to determine a separation distance between the at least one additional object and an adjacent side of the trailer; and upon aligning the hitch ball with the coupler, presenting a warning if it is determined, during maneuvering of the vehicle during reversing, that the separation distance is less than a threshold distance.

\* \* \* \* \*